(12) United States Patent
Chen et al.

(10) Patent No.: US 6,680,829 B2
(45) Date of Patent: Jan. 20, 2004

(54) MR STRUCTURES FOR HIGH AREAL DENSITY READER BY USING SIDE SHIELDS

(75) Inventors: Lujun Chen, West Hills, CA (US); James Giusti, Chanhassen, MN (US); Juan Jose Fernandez-de-Castro, Lakeville, MN (US); Jian Chen, Shakopee, MN (US); Sining Mao, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 292 days.

(21) Appl. No.: 09/934,096

(22) Filed: Aug. 20, 2001

(65) Prior Publication Data
US 2002/0030947 A1 Mar. 14, 2002

Related U.S. Application Data (60) Provisional application No. 60/232,476, filed on Sep. 13, 2000.

(51) Int. Cl.⁷ .............................................. G11B 5/127
(52) U.S. Cl. ........................................................ 360/319
(58) Field of Search ................................ 360/319, 121, 360/122, 119, 126, 317, 324.1, 324.11–324.12, 324.2

(56) References Cited

U.S. PATENT DOCUMENTS

| 3,623,038 A | 11/1971 | Franklin et al. ............ 340/174 |
| 4,422,118 A | 12/1983 | Helle et al. ................. 360/126 |
| 4,432,028 A | 2/1984 | Desserre et al. |
| 4,843,506 A | 6/1989 | Gill et al. |
| 4,885,649 A | 12/1989 | Das |
| 5,208,715 A | 5/1993 | Mowry |
| 5,515,221 A | 5/1996 | Gill et al. |
| 5,621,592 A | 4/1997 | Gill et al. |
| 5,687,044 A | 11/1997 | Saito |
| 5,838,521 A | 11/1998 | Ravipati |
| 5,898,548 A | 4/1999 | Dill et al. |
| 6,018,443 A | 1/2000 | Watanabe et al. |
| 6,040,962 A | 3/2000 | Kanazawa et al. |
| 6,094,328 A | 7/2000 | Saito ..................... 360/324.12 |
| 6,201,465 B1 | 3/2001 | Saito et al. ............... 338/32 R |
| 6,339,282 B2 * | 1/2002 | Maehara .................... 313/402 |
| 6,466,419 B1 * | 10/2002 | Mao ........................ 360/324.12 |
| 6,490,130 B2 * | 12/2002 | Sasaki et al. .............. 360/126 |
| 6,556,392 B1 * | 4/2003 | Mao et al. ............. 360/324.12 |
| 2002/0030947 A1 | 3/2002 | Chen et al. ................. 360/319 |

FOREIGN PATENT DOCUMENTS

| JP | 52138915 | 11/1977 |
| JP | 05182146 | 7/1993 |
| JP | 05325140 | 12/1993 |

* cited by examiner

Primary Examiner—Allen Cao
(74) Attorney, Agent, or Firm—Kinney & Lange, P.A.

(57) ABSTRACT

A magnetoresistive (MR) sensor for use in a magnetic storage system including a magnetic storage media having multiple concentric microtracks with information stored thereon. The MR sensor includes a plurality of generally parallel layers that form an MR stack. The MR sensor also includes a top shield and a bottom shield that are spaced apart on opposite sides of the MR stack in a longitudinal direction. The Mr sensor further includes a first and a second side shield spaced apart on opposite sides of the MR stack in a transverse direction. The top shield, bottom shield, first side shield and second side shield substantially surround the MR stack.

21 Claims, 7 Drawing Sheets

MR STRUCTURES FOR HIGH AREAL DENSITY READER BY USING SIDE SHIELDS

CROSS-REFERENCE TO RELATED APPLICATION(S)

This application claims the priority from provisional U.S. patent application 60/232,476, filed on Sep. 13, 2000 for "NEW MR STRUCTURES FOR HIGH AREAL DENSITY READER BY USING SIDE SHIELDS" for Lujun Chen, James Giusti, Juan Fernandez-de-Castro, Jian Chen and Sining Mao, which is incorporated by reference herein.

BACKGROUND OF THE INVENTION

The present invention relates generally to the field of electronic data storage and retrieval systems. In particular, the present invention relates to a novel configuration of a shielded magnetoresistive element of a transducing head.

In an electronic data storage and retrieval system, a transducing head typically includes a reader portion having a magnetoresistive (MR) sensor for retrieving magnetically-encoded information stored on a magnetic disc. MR sensors may be anisotropic magnetoresistive (AMR) sensors or giant magnetoresistive (GMR) sensors. AMR sensors generally have a single MR layer formed of a ferromagnetic material. GMR sensors generally have multiple layers of ferromagnetic material.

When an MR sensor is placed in close proximity to a rotating magnetized storage disc, the MR layer is exposed to magnetic bit fields previously written on the disc surface. Exposing the MR element to the magnetic bit fields in this way, affects the magnetization vector of the MR element. When a current is passed through the MR element, changes in resistance are detected as voltage changes. The change in resistance of the MR layer is due to the changing magnetization vector of the MR element. External circuitry then converts the voltage information into an appropriate format and manipulates that information into a series of binary ones and zeros that represent the recorded bits on the storage disc.

The information that is being read by the MR element is initially stored on the magnetic discs along concentric circular tracks or microtracks. A bit is the smallest unit of data that is stored on each microtrack. Obviously, only a finite amount of bits can be stored along a microtrack, and it is desirable to maximize that number. The number of bits written along a distance of one inch on one of those microtracks is called the linear bit density. It is also desirable to maximize the number of microtracks that are on a disc. The number of microtracks per inch along a radius of the disc is called the track density. The areal density is the product of the linear bit density and the track density. One way to accomplish the goal of increasing the total amount of information stored on a magnetic disc is to increase the areal density, that is, increase the bits stored in a microtrack, increase the amount of microtracks on a disc, or increase both.

As areal density increases, however, it becomes more and more difficult to read magnetically stored bits without also reading adjacent stored bits. As an ever-increasing amount of information is stored on a magnetized storage disc, it becomes more difficult for MR sensors to separately read the stored information without also reading noise from adjacent stored information.

This problem may be alleviated somewhat in MR sensors by placing soft magnetic material above and below the MR element to shield the element from the influence of bit fields of adjacent bits in a particular microtrack. During a read operation, these top and bottom shields typically insure that the MR sensor reads only the information stored directly beneath it on a specific microtrack of the magnetic medium or disc by absorbing any stray magnetic fields emanating from down track.

Top and bottom shields typically shield well as linear bit density increases, but they do not adequately shield stray magnetic fields from magnetically stored bits in adjacent microtracks to the microtrack being read at a particular time by the MR sensor when track density increases. As the track density increases, that is, as adjacent microtracks become closer and closer together, it becomes more imperative that a MR sensor is reading from only a single microtrack at any particular time and not from adjacent microtracks. As track pitch increases, that is, as spacing between adjacent microtracks become smaller, the reading error will increase. A MR sensor that accurately reads high track pitch media is a necessary improvement over the art of record.

BRIEF SUMMARY OF THE INVENTION

The present invention introduces a novel configuration of a shielded MR sensor for a read element of a magnetic head. The MR sensor includes an MR element that further has a top shield, a bottom shield, and first and second side shields. The first and second side shields decrease the response signal in the MR sensor to due to adjacent microtracks that are not intended to be read at a particular point in time. This allows accurate reading by MR sensor even where track density is relatively high.

DETAILED DESCRIPTION

Figure 1:
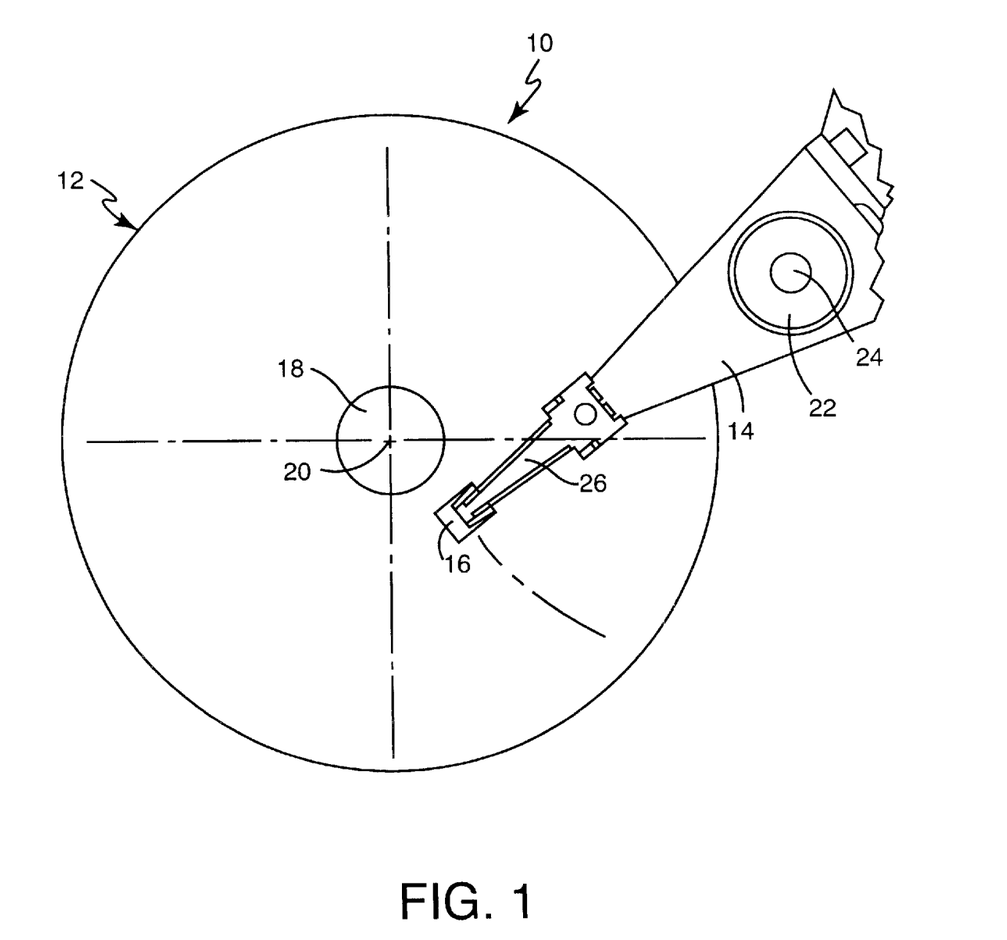
FIG. 1 is a diagram of a disc drive.

The present invention is particularly contemplated for use in a disc drive 10 exemplified in FIG. 1. Disc drive assembly 10 includes at least one disc 12 and actuator arm 14 with slider 16. Disc 12 is mounted on drive spindle 18, and during use of disc drive assembly 10, disc drive spindle 18 rotates disc 12 about axis 20. Actuator arm 14 is mounted on servo spindle 22 and is pivotable about axis 24 by an actuator such as a voice coil motor (not shown). Actuator arm 14 extends parallel to the plane of disc 12 and carries at least one flexure or suspension arm 26. Suspension arm 26 supports air bearing slider 16 adjacent a surface of disc 12.

As disc 12 rotates about drive spindle 18, the aerodynamic properties of slider 16 cause it to "fly" above the surface of disc 12. Slider 16 is supported on a thin cushion of air between the surface of disc 12 and the air bearing surface of slider 16.

A magnetoresistive (MR) sensor may be fabricated on the trailing edge of slider 16, and positioned as close as possible to rotating disc 12. Pivoting of actuator arm 14 moves slider 16 through an arc, and allows the MR sensor fabricated on slider 16 to change track position on disc 12. The MR sensor may then be employed for reading magnetically stored information from the surface of disc 12.

Figure 2:
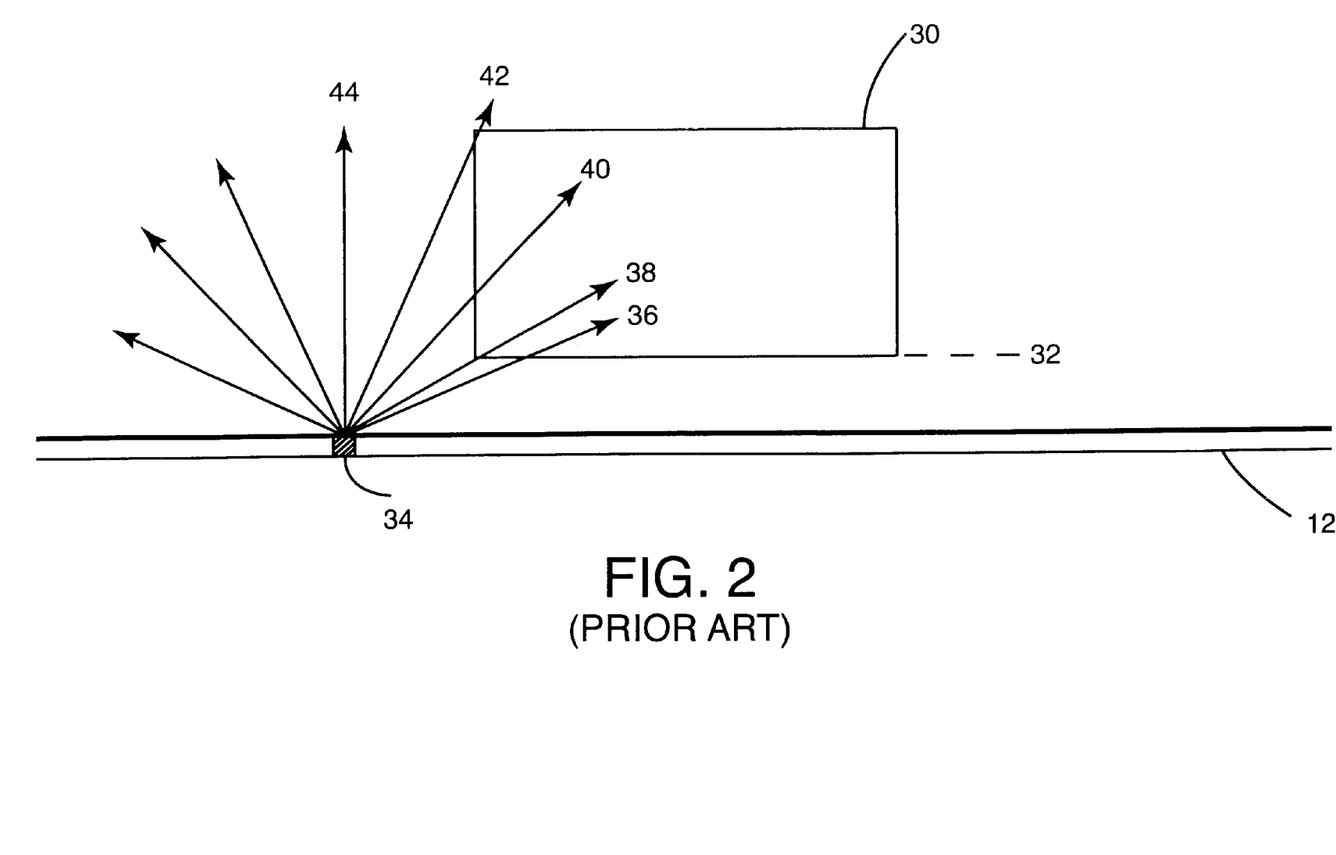
FIG. 2 shows an MR sensor of the prior art positioned relative to a field source in a microtrack.

FIG. 2 shows an MR sensor 30 of the prior art positioned relative to disc 12. MR sensor 30 has a lower side that is parallel to an air bearing surface 32 of slider 16. MR sensor 30 is positioned to be close enough to disc 12 so that magnetic fields extending from disc 12 will go through MR sensor 30. In FIG. 2, microtrack 34 is shown on disc 12. Microtrack 34 is one of a large multitude of microtracks on disc 12. In FIG. 2, microtrack 34 represents a "sidetrack" relative to MR sensor 30. In other words, at a particular point in time, MR sensor 30 is positioned to read a particular microtrack (not shown in FIG. 2) and microtrack 34 is an adjacent sidetrack or sidetrack, which MR sensor 30 is not intended to read at this particular point in time. Bit fields within microtrack 34 are magnetized in one direction or the other representing stored information on disc 12. As disc 12 is rotated relative to MR sensor 30, magnetic fields radiate radially in all directions from microtrack 34. When MR sensor 30 is close enough to microtrack 34, some of the magnetic field lines radiating from microtrack 34 penetrate into MR sensor 30. Field lines 36, 38, 40 and 42 are shown going into MR sensor 30. Field line 44 does not go through MR sensor 30. As track density increases, MR sensor 30 will receive magnetic field signals from sidetracks like microtrack 34.

The strength of the magnetic field from the stored bits in a microtrack like microtrack 34 is fairly strong in a sensor that is located directly proximate to the microtrack. The strength of this magnetic field fades rapidly, however, as the sensor moves away from the microtrack. The relationship between magnetic field strength and the position of the sensor relative to the microtrack is described by $1/r^2$, where r equals the radial distance between the sensor and the microtrack field source. Thus, as the sensor moves farther from the microtrack (i.e., as r increases), the strength of the magnetic field in the sensor due to the field source in that microtrack decreases.

Figure 3:
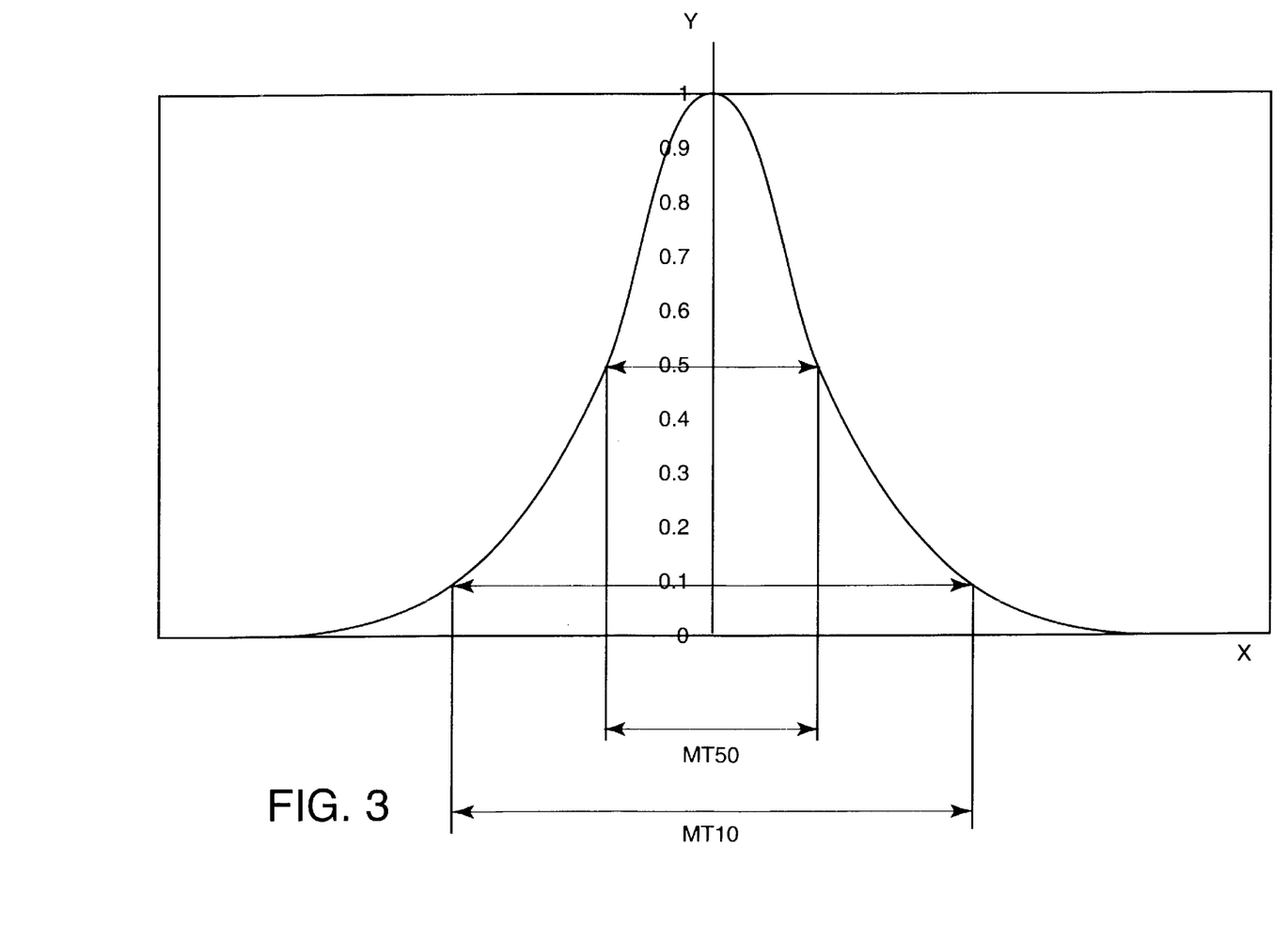
FIG. 3 shows a plot of the response of a MR sensor due to a field source versus the relative position of the MR sensor and the field source.

FIG. 3 is an illustration of the response of MR sensor 30 due to a field source in microtrack 34 as the relative position of microtrack 34 and MR sensor 30 changes. This is also referred to as the microtrack transition decay. In FIG. 3, the Y-axis illustrates the relative strength of the magnetic field in MR sensor 30 due to a field source in microtrack 34, while the X-axis represents the radial distance of MR sensor 30 to microtrack 34. As is evident from FIG. 3, the strength of the magnetic field in sensor 30 is highest when MR sensor 30 and microtrack 34 are separated by only a minimal distance. As the separation between MR sensor 30 and the microtrack 34 increases, the strength of the signal in MR sensor 30 declines rapidly, that is, it decays. As indicated above, this relationship is described by the microtrack transition decay $1/r^2$, where r equals the distance between the corner edge of MR sensor 30 and the field source in microtrack 34. The distance between two positions of microtrack 34 at which the signal strength decreases 50 percent from its maximum is known as MT50. The distance between two positions of microtrack 34 at which the signal decreases to 10 percent of its maximum is known as MT10.

Generally, when a sensor is reading from a particular microtrack at some point in time, adjacent microtracks, or "sidetracks" are far enough away from the sensor that the strength of the magnetic field in the sensor due to the field sources in the sidetracks is not high to affect the sensor's reading. As microtrack density increases, however, the strength of the signal in the sensor due to field sources in sidetracks will be high enough to affect the reading of the sensor and cause error. The field strength in a sensor at the position corresponding to MT10 is typically not high enough in a sidetrack to affect reading in the sensor. As the field strength increases for positions corresponding to MT10 through MT50, however, the field strength from sidetracks is strong enough to affect reading in the sensor. Thus, as microtrack density increase such that side tracks are in the MT10-MT50 positions relative to the sensor, the field sources in these sidetracks will introduce error in the sensor's reading. This "side reading effect" prevents accurate reading of information stored in the microtrack intended to be read.

Figure 4:
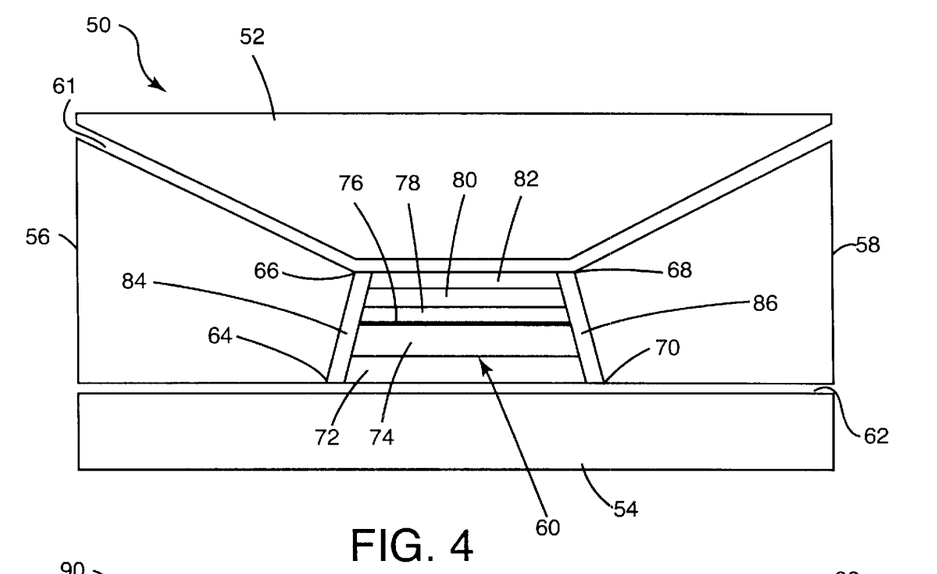
FIG. 4 shows an MR sensor in accordance with the present invention.

FIG. 4 shows MR sensor 50 in accordance with the present invention. MR sensor 50 includes top shield 52, bottom shield 54, first side shield 56, second side shield 58, and MR stack 60. Top and bottom and first and second side shields 52, 54, 56, and 58 and MR stack 60 are insulated from each other by reader gaps 61 and 62. Top and bottom and first and second side shields 52, 54, 56, and 58 substantially surround MR stack 60. First side shield 56 is bordered in certain locations by MR stack 60, and by reader gaps 61 and 62 thereby defining first and second side shield corners 64 and 66. Similarly, second side shield 58 is bordered in certain locations MR stack 60 and by reader gaps 61 and 62 thereby defining third and fourth side shield corners 68 and 70. MR stack 60 in accordance with the present inventions can be any sensor stack, for example, any type of CIP or CPP stack. In FIG. 4 only a spin valve stack is shown for illustrative purposes, which includes pinning layer 72, pinned layer 74, ruthenium layer 76, reference layers 78, copper spacer 80, MR element 82, first sensor end 84 and second sensor end 86. The unique configuration of MR sensor 50 allows an increase in microtrack density without causing reading errors in MR sensor 50 from sidetracks.

MR sensor 50 provides first and second side shields 56 and 58 to decrease the affect from adjacent microtracks as track density increases. MR sensor 50 as shown in FIG. 4 is a cross-sections taken parallel to air bearing surface 32. When reading from disc 12, MR sensor 50 and disc 12 move relative to each other such that MR stack 60 moves parallel or longitudinally to microtracks on disc 12. Thus, top and bottom shields 52 and 54 move down a given microtrack that is to be read. Side shields 56 and 58 are therefore transverse to the microtracks on disc 12. In this way, side shields 56 and 58 shield MR stack 60 from the affect of sidetracks to the track being read.

In MR sensor 50 first and second side shields 56 and 58 are a soft magnetic material and are in direct contact with first and second sensor ends 84 and 86. First and second sensor ends 84 and 86 are connected by copper spacer 80. Typically, first and second sensor ends 84 and 86 and copper spacer 80 are made of copper or other material with lower resistance but higher electron reflection ratio in order to enhance the GMR due to GMR side effect. Bias current is sent directly through first and second shields 56 and 58 and through MR element 82 such that changes in resistance in the MR element 82 are detected by sensing voltage changes, as with any AMR, GMR or similar device.

Figure 5:
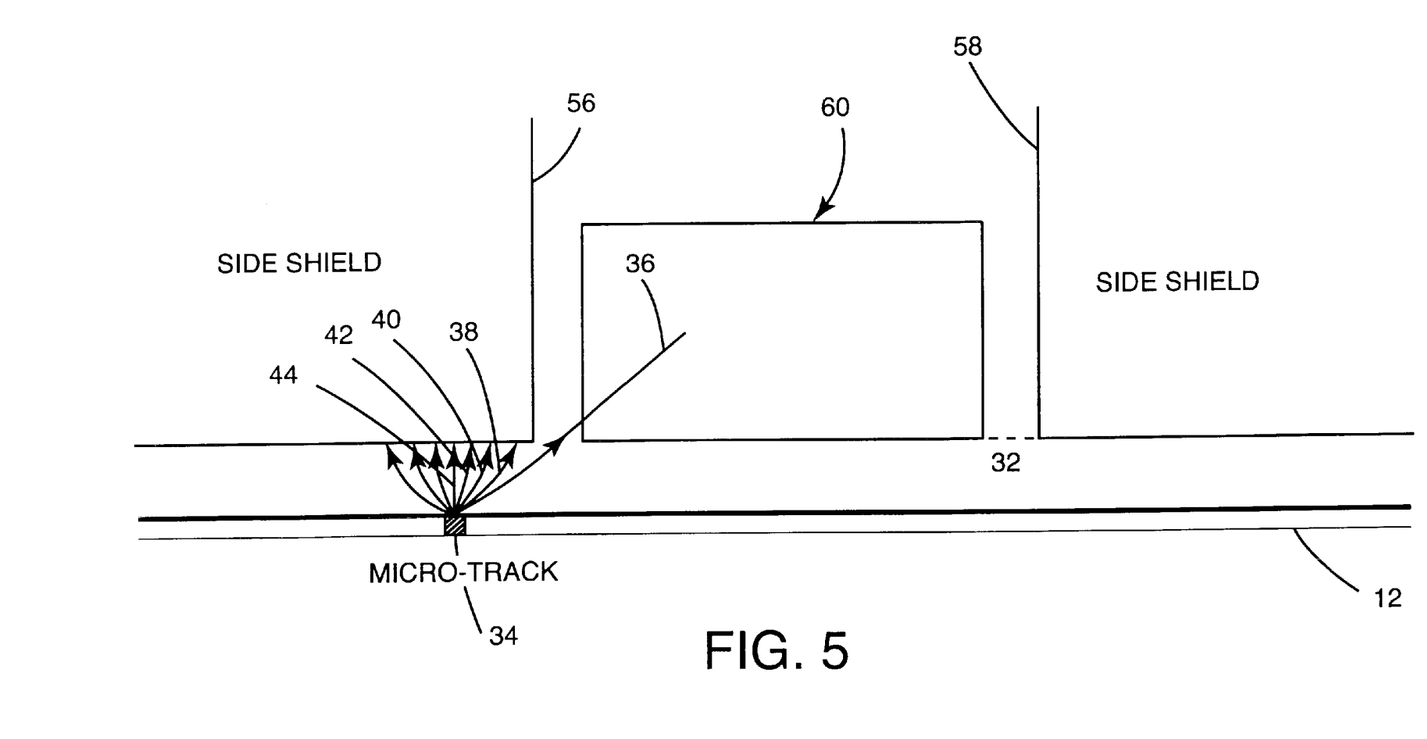
FIG. 5 show an MR sensor in accordance with the present invention positioned relative to a field source in a microtrack.

FIG. 5 shows MR sensor 50 in accordance with the present invention positioned relative to disc 12. MR sensor 50 has a lower side that is parallel with the air bearing surface 32 of slider 16. MR sensor 50 is positioned to be close enough to disc 12 so that magnetic fields extending from disc 12 will go through MR sensor 50. In FIG. 5, microtrack 34 is shown on disc 12. Microtrack 34 is one of a large multitude of microtracks on disc 12. As in FIG. 2, microtrack 34 in FIG. 5 represents a sidetrack relative to MR sensor 50. In other words, MR sensor 50 is positioned to read a particular microtrack (not shown in FIG. 5) at this point in time and microtrack 34 is an adjacent microtrack, which MR sensor 50 is not intended to read at this point in time. Bit fields within microtrack 34 are magnetized in one direction or the other representing stored information on disc 12. As disc 12 is rotated relative to MR sensor 50, magnetic fields radiate radially in all directions from microtrack 34. MR sensor 50 is provided with first side shield 56 and second side shield 58. Field lines 36, 38, 40, 42 and 44 are shown extending from microtrack 34. Instead of field lines 36, 38, 40, and 42 extending through MR stack 60, however, field lines 38, 40 and 42 are diverted into first side shield 56. Only field line 36, for example, is able to penetrate MR stack 60. In this way, first side shield 56 greatly decreases the affect that a sidetrack like microtrack 34 has on reading by sensor 50. This avoids error in reading that would otherwise occur.

Figure 6:
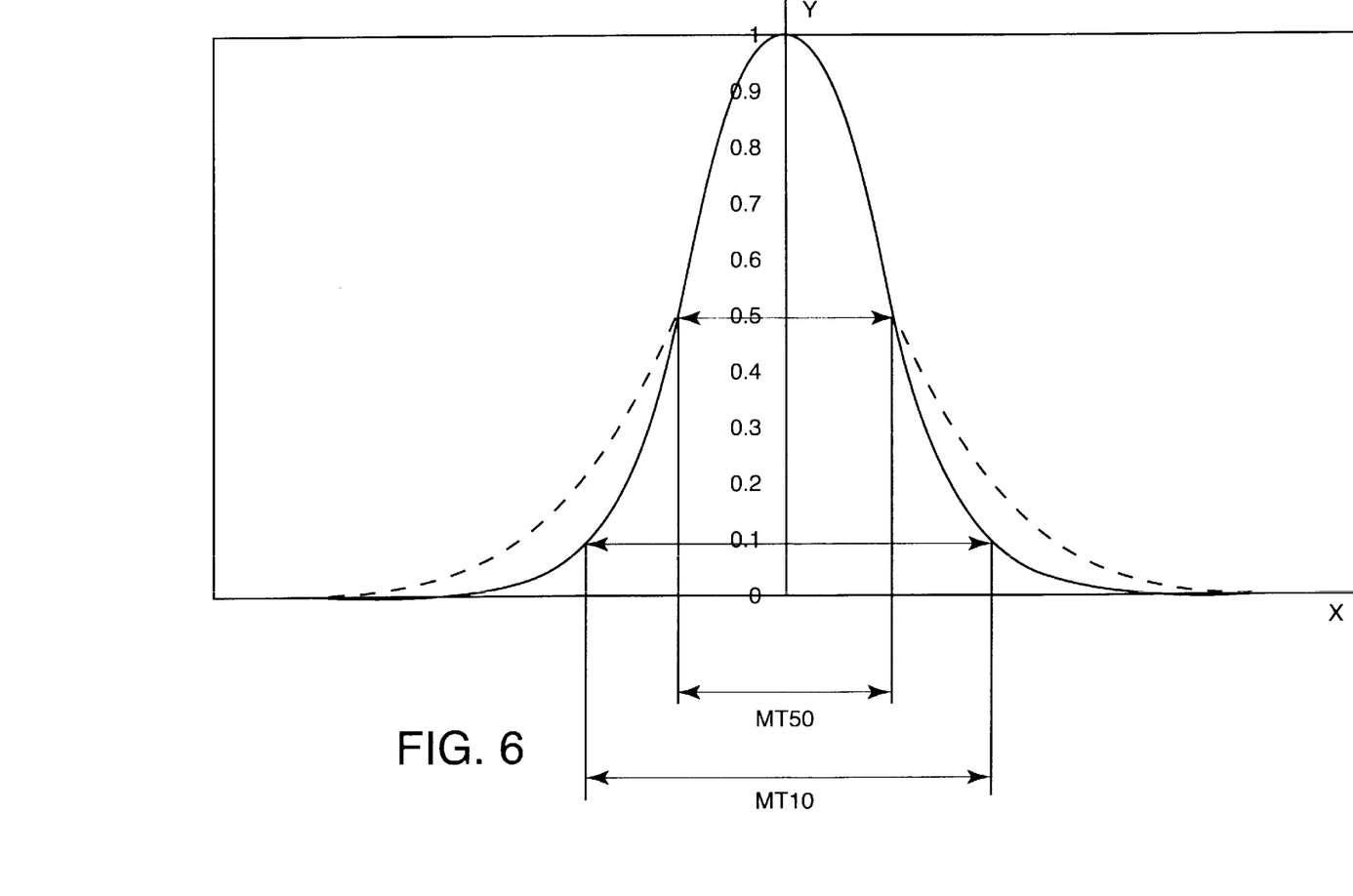
FIG. 6 shows a plot of the response of a MR sensor in accordance with the present invention due to a field source versus the relative position of the MR sensor and the field source.

By adding first and second side shields 56 and 58, the decay of the media field from sidetracks is enhanced. The solid line in FIG. 6 illustrates the response of MR sensor 50 due to a field source in a microtrack as the relative position of the microtrack and MR sensor 50 changes. Analogous to FIG. 3, the Y-axis in FIG. 6 illustrates the relative strength of the magnetic field in MR sensor 50 due to a field source in the microtrack, while the X-axis represents the radial distance of MR sensor 50 to the microtrack. While the relationship between magnetic field strength at the position of a prior art sensor relative to a microtrack as illustrated in FIG. 3 is described by $1/r^2$ (this relationship shown in FIG. 3 is repeated in FIG. 6 as a dotted line above the solid line for ease of comparison), the relationship between magnetic field strength and the position of MR sensor 50 relative to a microtrack is approximated by a decay $1/r^3$ (image dipole mixed with exponential decay), where r equals the radial distance between MR sensor 50 edge and the microtrack field source. Thus, MR sensor 50 greatly increases the microtrack transition decay compared to prior sensors.

As illustrated by the comparison of the dotted line curve (illustrating response of prior art MR sensor 30) and solid line curve (illustrating response of MR sensor 50) in FIG. 6, this change in the magnetic field strength to this new decay relationship corresponds to a much smaller MT10 and MT50. Thus, even when microtrack density increases, MT10–MT50 in MR sensor 50 will be decreased so that the affect of sidetracks on signal strength in MR sensor 50 will be greatly decreased.

Figure 7:
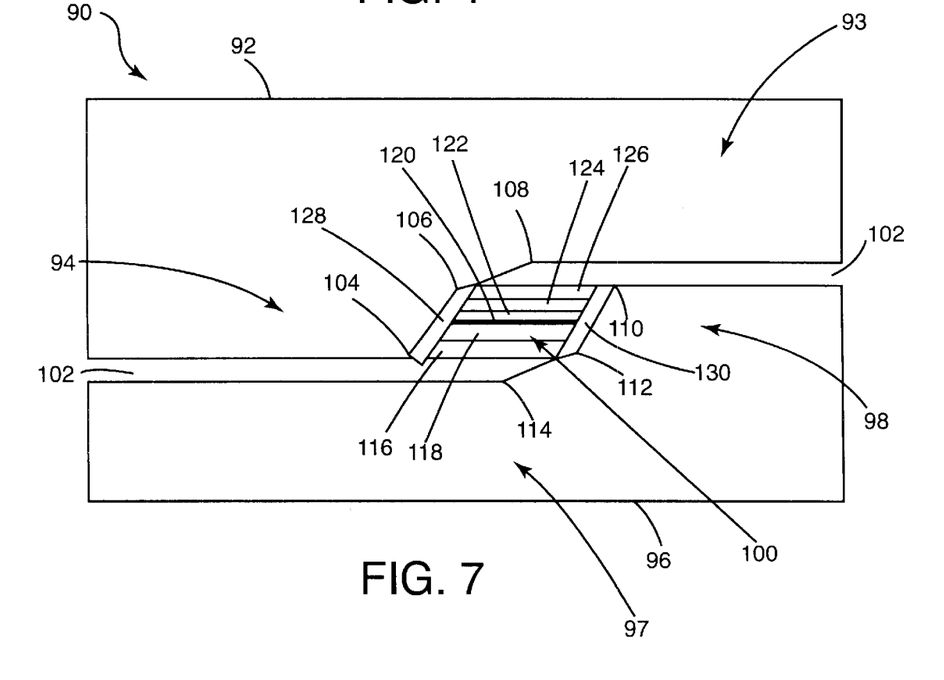
FIG. 7 shows an alternative embodiment of an MR sensor in accordance with the present invention.

FIG. 7 shows alternative MR sensor 90 in accordance with the present invention. MR sensor 90 includes top/side shield 92, bottom/side shield 96, and MR stack 100. Top/side shield 92 includes top shield region 93 and side shield region 94, while bottom/side shield 96 includes bottom region 97 and side shield region 98. Thus, as is readily apparent, top/side shield 92 functions both as a top shield and as a side shield and bottom/side shield 96 functions both as a bottom shield and as a side shield. Top/side shield 92, bottom/side shield 96, and MR stack 100 are insulated from each other by reader gap 102. Top/side shield 92 and bottom/side shield 96 substantially surround MR stack 100.

Top/side shield 92 is bordered by reader gap 102 and by MR stack 100 thereby defining first, second, and third corners 104, 106 and 108. Similarly, bottom/side shield 96 is bordered by reader gap 102 and by MR stack 100 thereby defining fourth, fifth, and sixth corners 110, 112 and 114. MR stack 100 again can be any sensor stack, for example, any kind of CIP or CPP stack. In FIG. 7, only a spin valve stack is shown for illustrative purposes, which includes pinning layer 116, pinned layer 118, ruthenium layer 120, reference layers 122, copper spacer 124, MR element 126, first sensor end 128, and second sensor end 130. MR sensor 90 is uniquely configured to allow an increase in microtrack density without causing reading errors in MR sensor 90 from side tracks.

MR sensor 90 provides the improve performance characteristics as discussed with respect to MR sensor 50 in FIG. 4. In MR sensor 90, top/side shield 92 is an integrated top shield and side shield. Thus, top/side shield 92 provides the known benefits of a top shield, while also providing the inventive benefits of a side shield. Similarly, in MR sensor 90, bottom/side shield 96 is an integrated bottom shield and side shield. Thus, bottom/side shield 96 provides the known benefits of a bottom shield, while also providing the inventive benefits of a side shield. Top/side shield 92 and bottom/side shield 96 enhance the decay of the media field from sidetracks as did first and second side shields 56 and 58 in MR sensor 50. Consequently, the response of MR sensor 90 due to a field source in a microtrack as the relative position of the microtrack in MR sensor 90 changes can also be illustrated by the solid line curve in FIG. 6.

MR sensor 90 also provides the advantage of less corner domain formation than MR sensor 50. In MR sensor 50, first, second, third, and fourth corners 64, 66, 68, and 70 of first and second side shields 56 and 58 are somewhat sharp. In other words, corners 64, 66, 68, and 70 are only slightly more than 90 degrees. With such sharp corner regions, first and second side shield 56 and 58 may have domain problems in these areas of the shields. The configuration of MR sensor 90 improves these regions to decrease the domain problems in corner regions of the shields. Specifically, first, second, third, fourth, fifth, and sixth corner regions 104, 106, 108, 110, 112, and 114 are more obtuse, that is, they are significantly larger that 90 degrees. In this way, the domain problems with the sharper corner regions of the first and second side shields 56 and 58 in MR sensor 50 are reduced in MR sensor 90.

Figure 8:
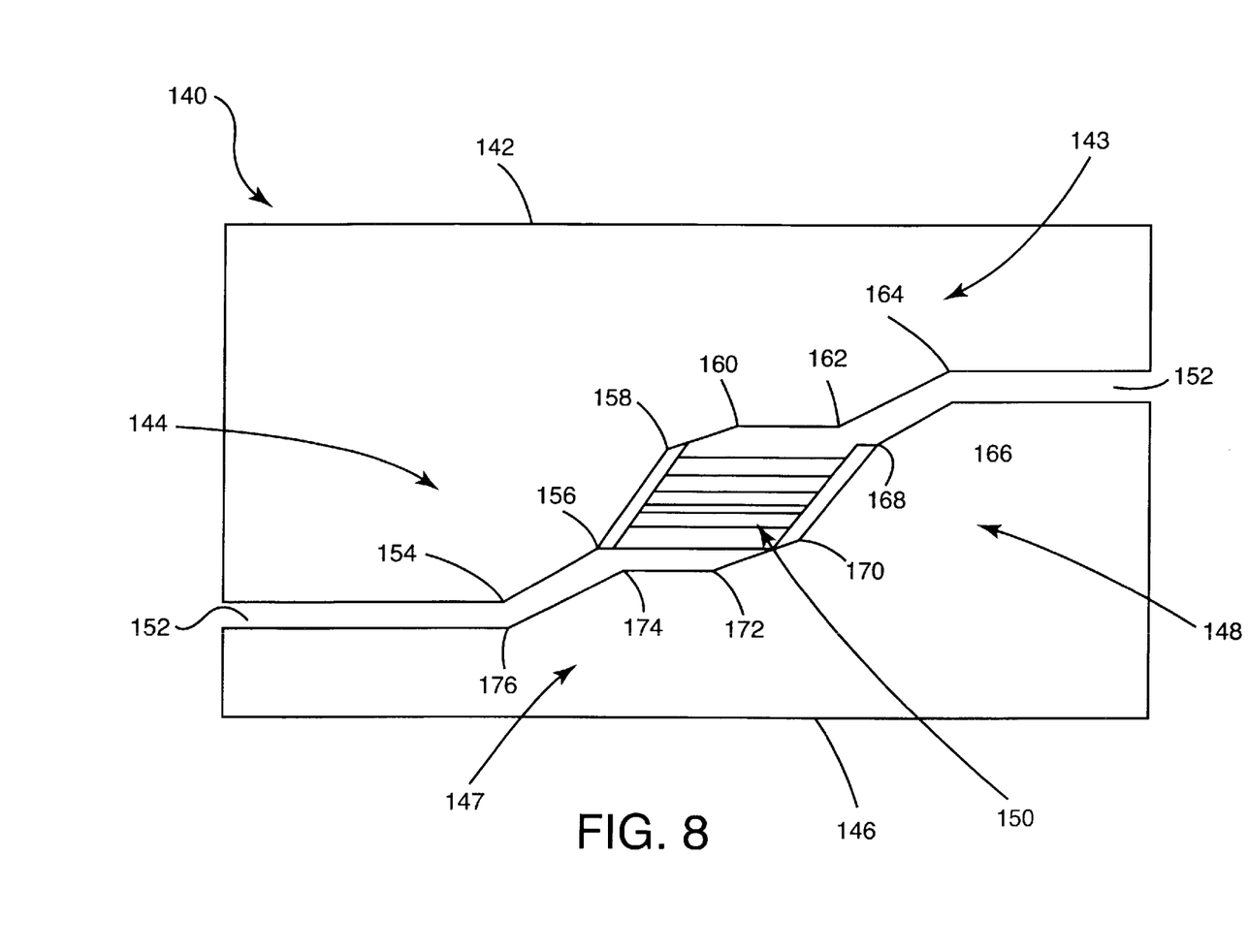
FIG. 8 shows another alternative embodiment of an MR sensor in accordance with the present invention.

FIG. 8 shows another alternative MR sensor 140, which is based on MR sensor 90, in accordance with the present invention. MR sensor 140 includes top/side shield 142, bottom/side shield 146, and MR stack 150. Top/side shield 142 includes top shield region 143 and side shield region 144, while bottom/side shield 146 includes bottom region 147 and side shield region 148. Thus, as in MR sensor 90, top/side shield 142 functions both as a top shield and as a side shield and bottom/side shield 146 functions both as a bottom shield and as a side shield. Top/side shield 142, bottom/side shield 146, and MR stack 150 are insulated from each other by reader gap 152. Top/side shield 142 and bottom/side shield 146 substantially surround MR stack 150.

Top/side shield 142 is bordered by reader gap 152 and by MR stack 150 thereby defining first, second, third, fourth, fifth and sixth corners 154, 156, 158, 160, 162 and 164. Similarly, bottom/side shield 146 is bordered by reader gap 152 and by MR stack 150 thereby defining seventh, eighth, ninth, tenth, eleventh, and twelfth corners 166, 168, 170, 172, 174 and 176. MR stack 150 is as described with respect to MR stack 100 in FIG. 7.

MR sensor 140 provides the improve performance characteristics as discussed with respect to MR sensors 50 and 90. Furthermore, the shield corners that were improved from MR sensor 50 to MR sensor 90 are further improved in Mr sensor 140. In MR sensor 140, first through twelfth corners 154–176 are all made even more obtuse, that is, they are all closer to 180 degrees than they are to 90 degrees. In this way, the domain problems with the sharper corner regions of the first and second side shields 56 and 58 in MR sensor 50 are reduced in MR sensor 140.

Side shields 56 and 58 in MR sensor 50, top/side shield 92 and bottom/side shield 96 in MR sensor 90, and top/side shield 142 and bottom/side shield 146 in MR sensor 140 are typically made of soft magnetic material such as nickel-iron alloy. Consequently, these side shields have low anisotropy and high permeability. These material properties allow the side shields to enhance the microtrack transition decay for each of the MR sensors.

MR sensors 50 and 90 as shown in FIGS. 4 and 7 are cross-sections taken parallel to air bearing surface 32. The dimension of MR sensors 50 and 90 extending perpendicular from air bearing surface 32 is commonly referred to as sensor height. The dimension of MR sensors 50 and 90 extending from one edge of the sensor to the opposite edge is the sensor width. When the sensor height and sensor width are comparable with the MR stack thickness, side shields become particularly important. Side shields can tolerate a higher sensor width to sensor height ratio, and reduce sensor height lapping. This is especially useful for perpendicular or pattern media recording.

Although the present invention has been described with reference to preferred embodiments, workers skilled in the art will recognize that changes may be made in form and detail without departing from the spirit and scope of the invention.

What is claimed is:

1. A magnetic reader for use in a magnetic storage system including a magnetic storage media having multiple concentric microtracks with information stored thereon, the magnetic reader comprising:
   a magnetoresistive (MR) sensor for reading information stored on the magnetic storage media, the MR sensor including an MR element, a bottom shield and a top shield; and
   means for reducing a signal in the MR sensor that is due to sidetracks to a microtrack being read at a given time, wherein the means for reducing a signal includes a first and second side shield spaced apart on opposite sides of the MR element in a transverse direction.

2. The magnetic reader of claim 1 wherein the first and second side shields are a soft magnetic material.

3. The magnetic reader of claim 1, wherein the first side shield is connected at an upper end to the top shield, and wherein the second side shield is connected at a lower end to the bottom shield.

4. A magnetoresistive (MR) sensor comprising:
   a plurality of generally parallel layers forming an MR stack;
   a top shield and a bottom shield spaced apart on opposite sides of the MR stack in a longitudinal direction;
   a first and a second side shield spaced apart on opposite sides of the MR stack in a transverse direction; and
   the top shield, bottom shield, first side shield and second side shield substantially surrounding the MR stack.

5. The magnetic reader of claim 4 wherein the first and second side shields are a soft magnetic material.

6. The MR sensor of claim 4 wherein the MR stack includes first and second sensors wherein the first sensor is in direct contact with the first side shield and the second sensor is in direct contact with the second side shield.

7. The MR sensor of claim 6 wherein bias current flows through the first and second sensors and through the first and second side shields.

8. The MR sensor of claim 4 wherein the MR sensor further includes a reader gap, wherein the reader gap and MR stack define corners of the first and second shields.

9. The MR sensor of claim 8 wherein none of the corners of the first and second side shields are sharp corners.

10. The MR sensor of claim 8 wherein each of the corners of the first and second side shields are greater than 135 degrees.

11. The MR sensor of claim 8 wherein each of the corners of the first and second side shields are greater than 100 degrees.

12. The MR sensor of claim 4, wherein the top shield and the first side shield comprise a single piece of material and wherein the bottom shield and the second side shield comprise a single piece of material.

13. A magnetic storage system including a magnetic reader and a magnetic storage media, the magnetic storage media having multiple concentric microtracks having a width and having information stored thereon, the magnetic reader configured to travel relative to the microtracks in a direction that is generally perpendicular to the width of the microtracks, the magnetic reader further comprising:
   an MR stack;
   a top shield and a bottom shield spaced apart on opposite sides of the MR stack in a direction parallel to the direction of relative travel between the microtrack and the magnetic reader;
   a first and a second side shield spaced apart on opposite sides of the MR stack in a direction transverse to the direction of relative travel between the microtrack and the magnetic reader; and
   wherein the first and second side shields are located closer to the microtrack being read than they are to adjacent microtracks that are not being read.

14. The magnetic reader of claim 13 wherein the first and second side shields are a soft magnetic material.

15. The MR sensor of claim 13 wherein the MR stack includes first and second sensors wherein the first sensor is in direct contact with the first side shield and the second sensor is in direct contact with the second side shield.

16. The MR sensor of claim 15 wherein bias current flows through the first and second sensors and through the first and second side shields.

17. The MR sensor of claim 13 wherein the MR sensor further includes a reader gap, wherein the reader gap and MR stack define corners of the first and second shields.

18. The MR sensor of claim 17 wherein none of the corners of the first and second side shields are sharp corners.

19. The MR sensor of claim 17 wherein each of the corners of the first and second side shields are greater than 135 degrees.

20. The MR sensor of claim 17 wherein each of the corners of the first and second side shields are greater than 100 degrees.

21. The MR sensor of claim 13, wherein the top shield and the first side shield comprise a single piece of material and wherein the bottom shield and the second side shield comprise a single piece of material.

* * * * *